(12) United States Patent
Baldet et al.

(10) Patent No.: US 8,229,636 B2
(45) Date of Patent: Jul. 24, 2012

(54) METHOD AND UNIT FOR SHIFTING GEAR IN A POWER-ASSIST TRANSMISSION

(75) Inventors: Franck Baldet, Torre Maina (IT); Luca Poggio, Casalecchio di Reno (IT); Amedeo Visconti, Turin (IT)

(73) Assignee: Ferrari S.p.A., Modena (IT)

( * ) Notice: Subject to any disclaimer, the term of this patent is extended or adjusted under 35 U.S.C. 154(b) by 744 days.

(21) Appl. No.: 11/884,635

(22) PCT Filed: Feb. 17, 2006

(86) PCT No.: PCT/IB2006/000318
§ 371 (c)(1),
(2), (4) Date: Apr. 2, 2009

(87) PCT Pub. No.: WO2006/087626
PCT Pub. Date: Aug. 24, 2006

(65) Prior Publication Data
US 2009/0210123 A1    Aug. 20, 2009

(30) Foreign Application Priority Data
Feb. 18, 2005  (IT) .................................. BO05A0086

(51) Int. Cl.
*G06F 19/00* (2006.01)
(52) U.S. Cl. ........................................ 701/66; 701/54
(58) Field of Classification Search .............. 701/51–54, 701/62, 64, 66; 477/34; 74/473.21
See application file for complete search history.

(56) References Cited

U.S. PATENT DOCUMENTS

| 4,245,344 A | 1/1981 | Richter |
| 4,507,736 A * | 3/1985 | Klatt ................................ 701/52 |
| 4,922,427 A * | 5/1990 | Yokote et al. ................... 701/48 |
| 5,485,465 A | 1/1996 | Liu et al. |

FOREIGN PATENT DOCUMENTS

| DE | 38 30 938 A1 | 4/1990 |
| DE | 102 61 872 A1 | 7/2004 |
| EP | 0 355 070 A | 2/1990 |
| EP | 0 512 708 A | 11/1992 |
| EP | 0 828 098 A | 3/1998 |
| EP | 1 211 443 A | 6/2002 |
| EP | 1 344 964 A | 9/2003 |
| FR | 2 793 857 A | 11/2000 |
| FR | 2 844 859 A | 3/2004 |
| GB | 1 500 818 A | 2/1978 |

OTHER PUBLICATIONS

International Search Report for PCT/IB2006/000318 dated Nov. 7, 2006.

* cited by examiner

*Primary Examiner* — Yonel Beaulieu
(74) *Attorney, Agent, or Firm* — Graybeal Jackson LLP

(57) ABSTRACT

A method and unit for shifting gear in a power-assist transmission; to shift gear, a series of operations are performed in sequence, and each of which must be completed prior to completion of the next operation; for each operation, a predicted time delay is estimated corresponding to the time lapse between the instant the operation is commanded and the instant the operation is actually completed; and the operations are commanded successively as a function of the predicted delay times, so that an operation is commanded before the preceding operation has actually been completed.

18 Claims, 6 Drawing Sheets

METHOD AND UNIT FOR SHIFTING GEAR IN A POWER-ASSIST TRANSMISSION

PRIORITY CLAIM

The present application is a United States national phase application filed pursuant to 35 USC §371 of International Patent Application No. PCT/IB2006/000318, filed Feb. 17, 2006; which application claims the benefit of Italian Patent Application No. BO2005A000086, filed Feb. 18, 2005; all of the foregoing applications are incorporated herein by reference in their entireties.

TECHNICAL FIELD

An embodiment relates to a method and unit for shifting gear in a power-assist transmission.

BACKGROUND

Power-assist transmissions, which are becoming increasingly popular, are structurally similar to a conventional manual transmission, except that the user-operated clutch pedal and gear lever are replaced by corresponding electric or hydraulic servocontrols. In a power-assist transmission, the user simply sends an up- or downshift order to a transmission central control unit, which independently shifts gear by acting on both the engine and the clutch and gearbox servocontrols.

A gear-shift order may be generated manually, i.e. by the driver, or automatically, i.e. independently of the driver. When a gear-shift order is generated, the transmission central control unit drives the clutch servocontrol to release the clutch and separate a primary shaft of the gearbox mechanically from a drive shaft, and simultaneously acts on the engine central control unit to temporarily reduce the drive torque generated by the engine.

On determining release of the clutch, the transmission central control unit drives the gearbox servocontrols to disengage the currently engaged gear; on determining disengagement of the gear, the transmission central control unit drives the gearbox servocontrols to move the primary shaft with respect to a secondary shaft and so prepare to engage the new gear; and, on determining the desired position of the primary shaft with respect to the secondary shaft, the transmission central control unit drives the gearbox servocontrols to engage the new gear.

Finally, on determining engagement of the new gear, the transmission central control unit drives the clutch servocontrol to engage the clutch and so connect or couple the primary shaft of the gearbox and the drive shaft angularly integral with each other, and simultaneously acts on the engine central control unit to restore the drive torque generated by the engine.

It is important to note that the transmission central control unit and the engine central control unit currently communicate over an on-vehicle, typically CAN protocol, BUS line. In other words, using the on-vehicle BUS line, the transmission central control unit sends a first message to the engine central control unit requesting it to cut off the drive torque generated by the engine, and subsequently sends a second message to the engine central control unit requesting it to restore the drive torque generated by the engine. To prevent the wrong commands being performed, a normal copy followed immediately by a complemented copy of each message is transmitted; and the engine central control unit compares the two successive in-coming messages, and only performs the command if the two messages are consistent.

The BUS fails to provide for precise synchronization, on account of the randomly variable time lapse, normally ranging between 20 ms and 40 ms, between the instant a message is sent by the transmission central control unit and the instant the relative command is performed by the engine central control unit. As a result, after sending a message to the engine central control unit, the transmission central control unit must determine performance of the command contained in the message to determine the exact timing with which the command is performed.

In normal driving conditions, a power-assist transmission is expected to shift gear rapidly with no sharp longitudinal acceleration/deceleration of the vehicle, which, besides annoying the occupants of the vehicle, subjects the transmission to unnecessary mechanical stress. And in racing mode, a power-assist transmission is expected to shift gear as fast as possible without subjecting the transmission to excessive mechanical stress.

Currently marketed power-assist transmissions operating as described above normally take from 250 to 600 ms to shift gears. Obviously, the actual time taken depends on dynamic performance of the transmission components and the degree of comfort demanded. A 250 ms gear shift is in itself fast, but is still relatively slow in racing mode and particularly in competition racing mode.

EP0512708A2, which is incorporated by reference, discloses a control method/system for minimizing the time required to complete a compound power downshift of an automated transmission system comprising a compound range type transmission provided with a power synchronizer effective only when the auxiliary section is engaged is provided.

EP0355070A1, which is incorporated by reference, discloses a torque modulation control process for a thermal engine associated with an automatic transmission, wherein the electronic control cabinet of the automatic transmission acts on a control member of the engine by means of a one-way and single-wire connection by means of a torque modulation signal which is an all-or-nothing signal of modulated duration, so as to act on the engine torque during gear changes.

SUMMARY

An embodiment provides a method and unit for shifting gear in a power-assist transmission, which method and unit are cheap and easy to implement and, at the same time, eliminate the aforementioned drawbacks and provide for shifting gear in less than 130-140 ms.

BRIEF DESCRIPTION OF THE DRAWINGS

A non-limiting embodiment will be described by way of example with reference to the accompanying drawings.

DETAILED DESCRIPTION

Figure 1:
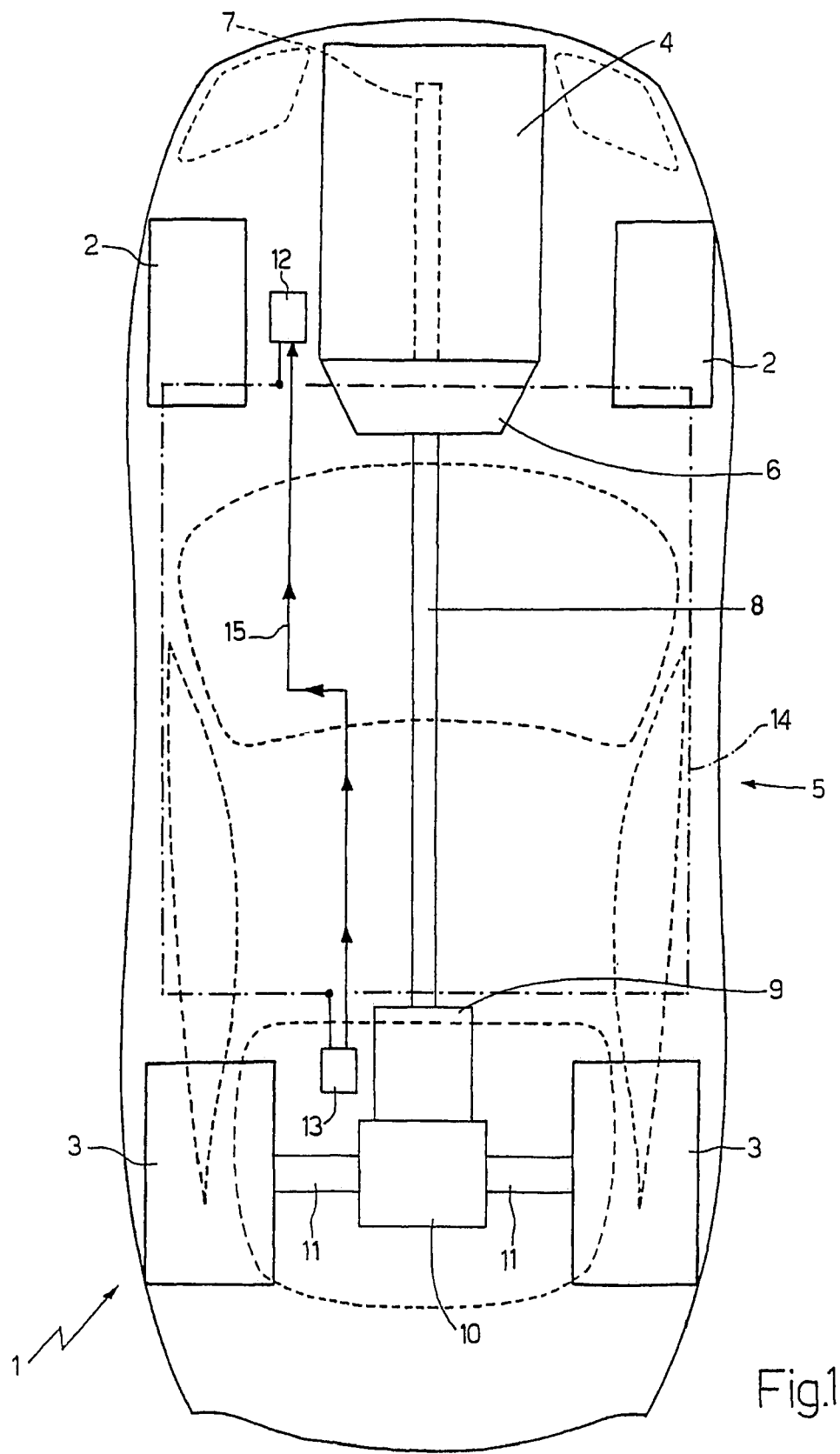
FIG. 1 shows a schematic plan view of a rear-wheel-drive vehicle featuring a power-assist transmission operating in accordance with a method according to an embodiment.

Number 1 in FIG. 1 indicates a vehicle having two front wheels 2 and two rear drive wheels 3. A front internal combustion engine 4 produces a drive torque which is transmitted to rear drive wheels 3 by a power-assist transmission 5. Power-assist transmission 5 comprises a power clutch 6 housed in a casing integral with engine 4, and which couples or connects the drive shaft 7 of engine 4 to a propeller shaft 8 terminating in a power-assist gearbox 9 at the rear. Cascade-connected to power-assist gearbox 9 is a self-locking differential 10, from which extend two axle shafts 11, each integral with a respective rear drive wheel 3.

Vehicle 1 comprises a central control unit 12 controlling engine 4; a central control unit 13 controlling transmission 5; and a CAN (Car Area Network) protocol BUS line 14 extending to the whole of vehicle 1. Central control unit 12 of engine 4 and central control unit 13 of transmission 5 are both connected to BUS line 14, and can therefore communicate with each other by messages over BUS line 14. Central control unit 12 of engine 4 and central control unit 13 of transmission 5 are also connected to each other directly over a dedicated electric synchronization cable 15, which transmits a binary signal from central control unit 13 of transmission 5 to central control unit 12 of engine 4.

Figure 2:
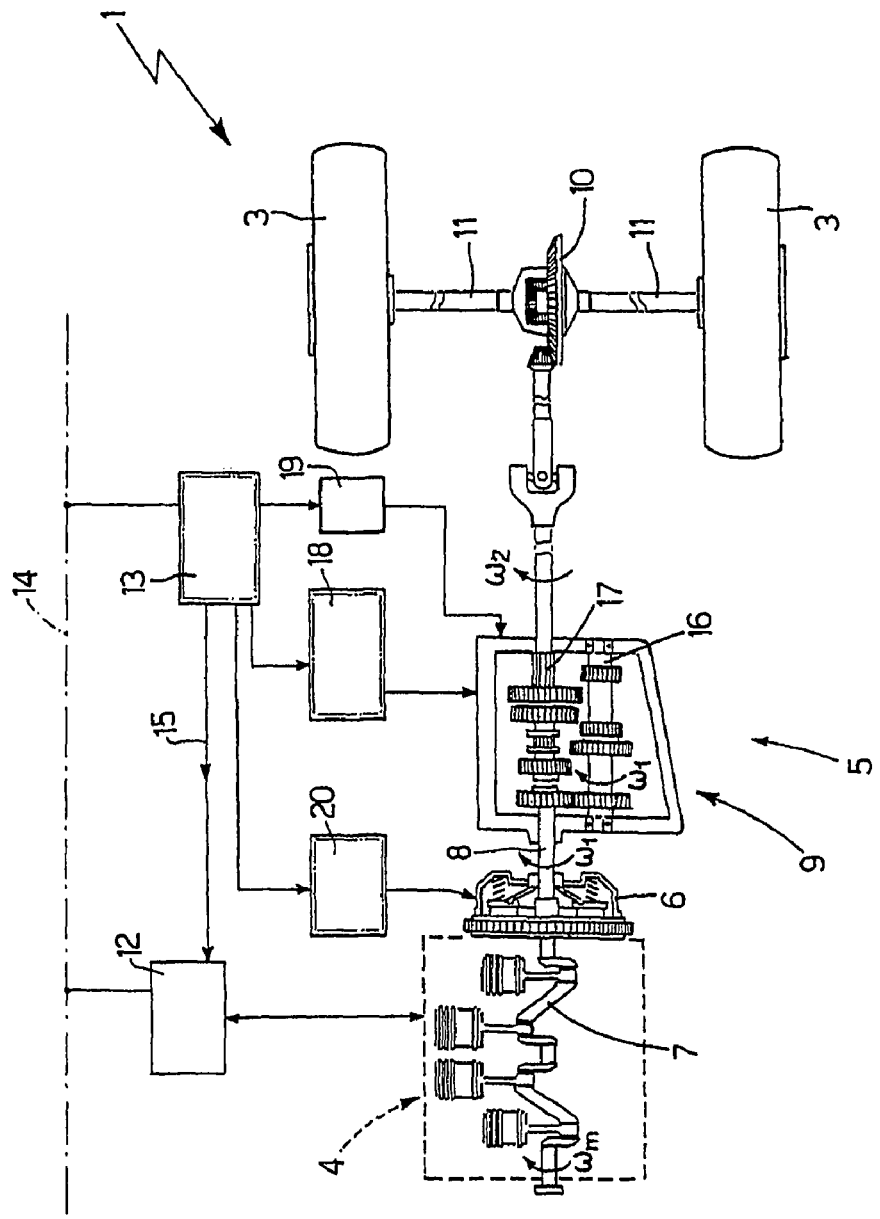
FIG. 2 shows a schematic view of an engine and a power-assist transmission of the FIG. 1 vehicle.

As shown in FIG. 2, power-assist gearbox 9 comprises a primary shaft 16 which rotates at an angular speed ω1; and a secondary shaft 17 which rotates at an angular speed ω2 and transmits motion to rear drive wheels 3 via differential 10 and the two axle shafts 11. Power-assist gearbox 9 is operated by a gear-shift servocontrol 18 and by a gear-selection servocontrol 19; servocontrols 18 and 19 may be electric or hydraulic, and are controlled by central control unit 13 of transmission 5.

Primary shaft 16 is connected via power clutch 6 to drive shaft 7, which is rotated by engine 4 at an angular speed ωm. Power clutch 6 is operated by a servocontrol 20, which is preferably hydraulic and is controlled by central control unit 13 of transmission 5.

In manual transmission control mode, the driver of vehicle 1 sends a gear-shift command in known manner to central control unit 13 of transmission 5. When shifting from the current gear to the next, central control unit 13 commands performance, in sequence, of a series of operations, each of which is completed prior to completion of the next operation. More specifically, the series of operations to be performed to shift from the current gear to the next comprises:

cutting off the drive torque generated by engine 4;
releasing power clutch 6 by operating servocontrol 20;
disengaging the current gear by operating servocontrol 18;
selecting the next gear by operating servocontrol 19;
engaging the next gear by operating servocontrol 18;
engaging power clutch 6 by operating servocontrol 20; and
restoring the drive torque generated by engine 4.

When shifting is commenced and simultaneously with release of power clutch 6, the drive torque generated by engine 4 is substantially zeroed to prevent a sharp, uncontrolled increase in the angular speed ωm of drive shaft 7. When shifting is completed and simultaneously with engagement of power clutch 6, the drive torque generated by engine 4 is restored to the same value it was at immediately prior to shifting gear, to avoid discontinuity resulting in sharp longitudinal acceleration/deceleration.

Servocontrols 18, 19 and 20 are controlled directly by central control unit 13 of transmission 5; whereas the drive torque generated by engine 4 is regulated by central control unit 12 of engine 4 by specific request from central control unit 13 of transmission 5. More specifically, central control unit 13 of transmission 5 requests variations in drive torque by central control unit 12 of engine 4 over dedicated electric synchronization cable 15 directly connecting central control unit 13 of transmission 5 to central control unit 12 of engine 4.

In an embodiment, central control unit 13 of transmission 5 normally sends a low logic state over dedicated electric synchronization cable 15, and sends a high logic state when the drive torque generated by engine 4 is to be cut off when shifting gear. In other words, on receiving a low logic level over dedicated electric synchronization cable 15, central control unit 12 of engine 4 operates normally and supplies a given drive torque substantially as commanded by the driver; whereas, on receiving a high logic level over dedicated electric synchronization cable 15, central control unit 12 of engine 4 cuts off the drive torque and maintains a substantially zero drive torque as long as a high logic level is received over dedicated electric synchronization cable 15.

In an embodiment, redundant commands are sent by central control unit 13 of transmission 5 to central control unit 12 of engine 4, to allow central control unit 12 of engine 4 to check the consistency of incoming commands at all times. In the event of inconsistency of the incoming commands, a fault condition is diagnosed and an emergency operating procedure activated. More specifically, transmission of a drive torque change command from central control unit 13 of transmission 5 to central control unit 12 of engine 4 causes the drive torque change command be sent by central control unit 13 of transmission 5 to central control unit 12 of engine 4 over dedicated electric synchronization cable 15, and that, at the same time, the same command be sent by central control unit 13 of transmission 5 to central control unit 12 of engine 4 in a confirm message over BUS line 14. Central control unit 12 of engine 4 executes the in-coming drive torque change command over dedicated electric synchronization cable 15 as soon as it is received, and suspends execution of the drive torque change command if the confirm message over BUS line 14 is not received within a given time interval. In the event of a mismatch between the in-coming commands over dedicated electric synchronization cable 15 and BUS line 14, a fault condition of dedicated electric synchronization cable 15 is diagnosed, and only the commands sent over BUS line 14 are executed.

In an embodiment, to cut off the drive torque generated by engine 4 when shifting gear, central control unit 12 of engine 4 leaves the throttle setting of engine 4 unchanged, and simply controls the injectors to cut off fuel injection. This control method provides for rapidly cutting off, and equally rapidly restoring, the drive torque. It is important to bear in mind, in fact, that controlling the throttle of engine 4 involves moving mechanical parts with a fairly high degree of mechanical inertia, whereas the injectors can be controlled extremely rapidly.

When designing and setting up power-assist transmission 5, for each operation involved in shifting gear, a predicted delay time DT is determined and stored in a memory (not shown) of central control unit 13 of transmission 5. The predicted delay time DT of an operation corresponds to the time lapse between the instant the operation is commanded, and the instant the operation is actually completed.

In a preferred embodiment, at each gear shift operation, each predicted delay time DT is checked and, if necessary, corrected. In other words, at each gear shift operation, the actual value of each predicted delay time DT is determined, and, if the memorized predicted delay time DT differs significantly from the measured delay time DT, the memorized predicted delay time DT is corrected using the measured delay time DT. If the memorized predicted delay time DT differs significantly from the measured delay time DT, the new memorized predicted delay time DT is calculated as the average (possibly weighted) of the previous memorized predicted delay time DT and the measured delay time DT.

In one possible embodiment, each predicted delay time DT may be expressed as a function of actual working temperature, i.e. as a function of the temperature of a cooling fluid of engine 4.

Figure 3:
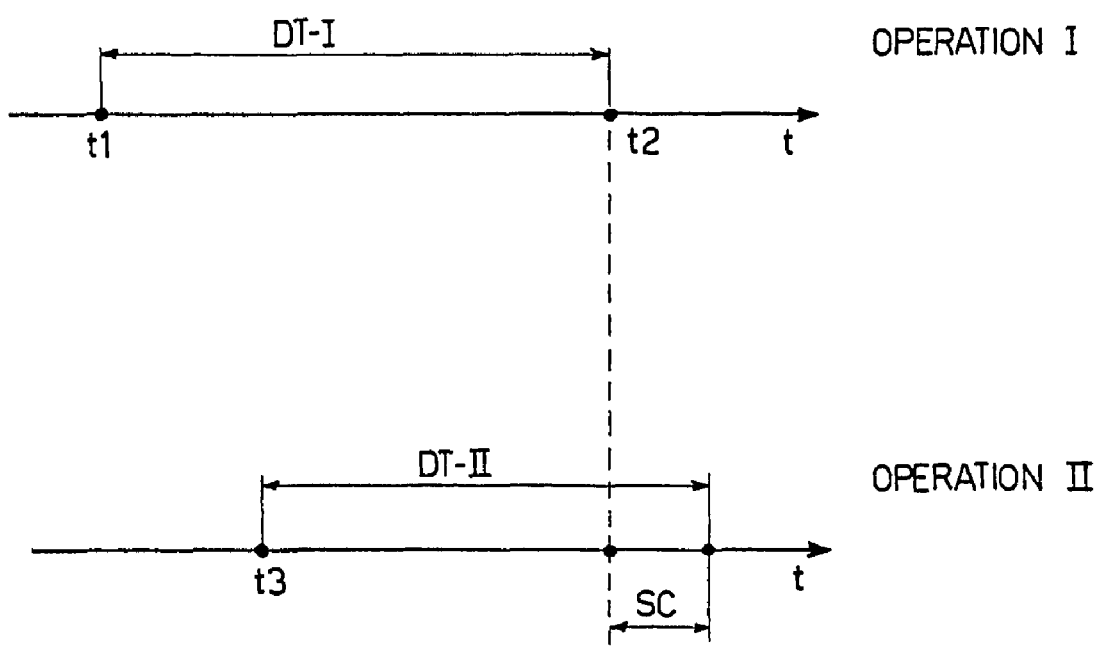
FIG. 3 shows, schematically, the time sequence of two operations performed by the FIG. 2 power-assist transmission when shifting gear.
Figure 4:
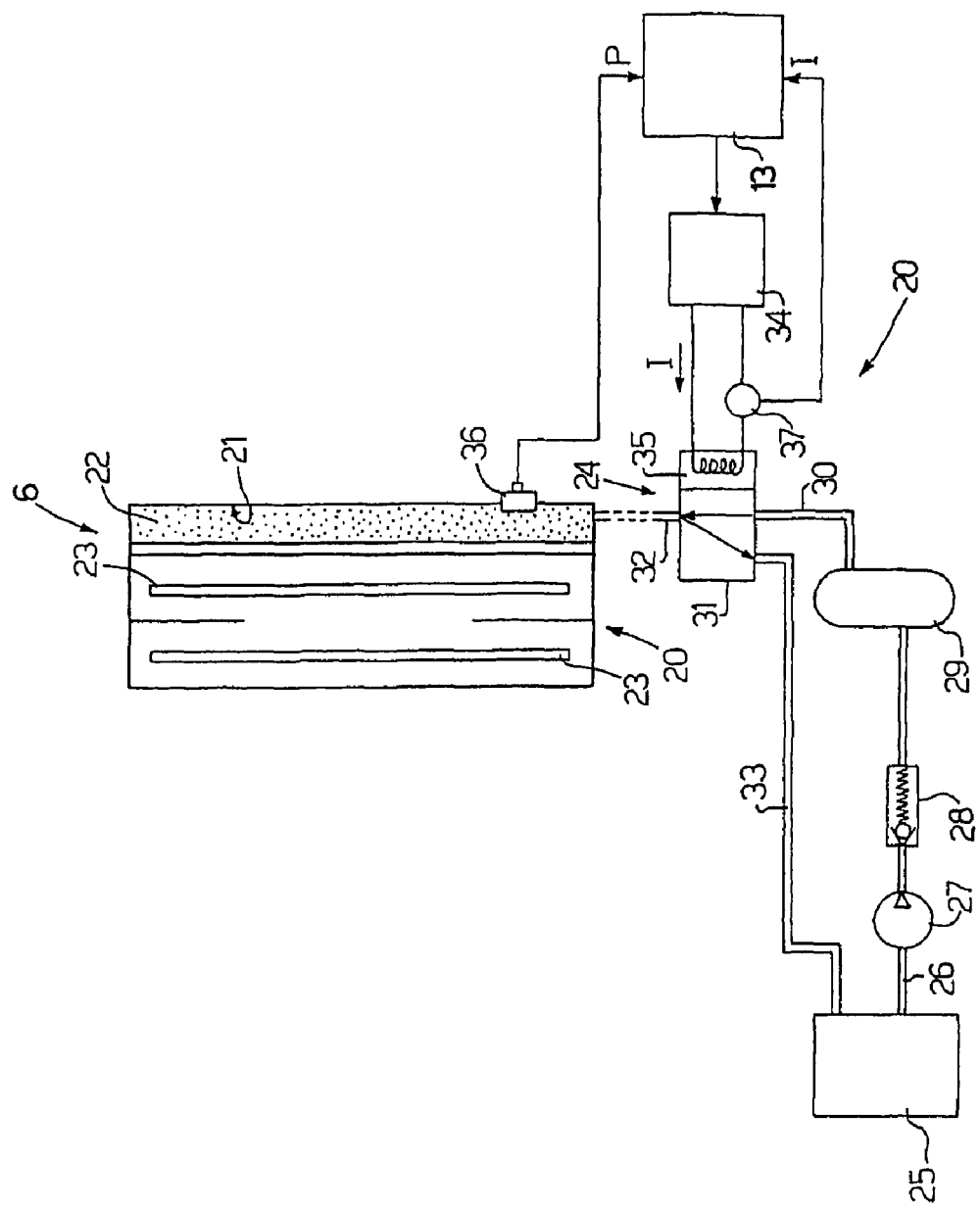
FIG. 4 shows a schematic view of a servocontrol of a power clutch of the FIG. 2 power-assist transmission.

As stated, to shift from the current gear to the next, a series of operations are performed successively, and each of which is completed prior to completion of the next operation. With particular reference to the FIG. 3 time diagram, central control unit 13 of transmission 5 commands a first operation (OPERATION I) at an instant t1, then estimates an instant t2 at which the first operation will actually be completed, by adding the predicted delay time DT of the first operation to instant t1 at which the first operation was commanded. At this point, central control unit 13 of transmission 5 determines an instant t3 at which to command a second successive operation (OPERATION II), by subtracting from instant t2 the predicted delay time DT of the second successive operation minus a safety constant SC, the function of which is to prevent overlapping of the instant the first operation is actually performed and the instant the second successive operation is actually performed.

The above control is applied to all the operations to be performed successively to shift gear, so that the instant an operation is actually completed is separated from the instant the next operation is actually completed by a time lapse equal to safety constant SC.

A preceding operation is therefore completed prior to completion of the next operation, but may be performed simultaneously, or at least partly simultaneously, with the next operation. In other words, a preceding operation is performed simultaneously, or practically simultaneously, with the next operation, on condition that the preceding operation is completed prior to completion of the next operation.

On receiving the gear shift command, central control unit 13 of transmission 5 immediately requests cut-off of the drive torque by central control unit 12 of engine 4, then determines the instant at which the drive torque will actually be cut off, and then determines the instant at which to command release of power clutch 6, so that power clutch 6 is actually released just after (i.e. after a time lapse equal to safety constant SC) the drive torque is actually cut off.

Using the instant at which release of power clutch 6 will actually be completed, central control unit 13 of transmission 5 determines the instant at which to command disengagement of the current gear, so that the current gear is actually disengaged just after (i.e. after a time lapse equal to safety constant SC) power clutch 6 is actually released.

Using the instant at which disengagement of the current gear will actually be completed, central control unit 13 of transmission 5 determines the instant at which to command selection of the next gear, so that the next gear is actually selected just after (i.e. after a time lapse equal to safety constant SC) the current gear is actually disengaged.

Using the instant at which selection of the next gear will actually be completed, central control unit 13 of transmission 5 determines the instant at which to command engagement of the next gear, so that the next gear is actually engaged just after (i.e. after a time lapse equal to safety constant SC) the next gear is actually selected.

Using the instant at which engagement of the next gear will actually be completed, central control unit 13 of transmission 5 determines the instant at which to command engagement of power clutch 6, so that power clutch 6 is actually engaged just after (i.e. after a time lapse equal to safety constant SC) the next gear is actually engaged.

Using the instant at which engagement of power clutch 6 will actually be completed, central control unit 13 of transmission 5 determines the instant at which to command restoration of the drive torque generated by engine 4, so that the drive torque is actually restored just after (i.e. after a time lapse equal to safety constant SC) power clutch 6 is actually engaged.

In an embodiment, the value of safety constant SC is a function of the driving mode adopted by the driver of vehicle 1. More specifically, as driving mode tends increasingly towards racing mode, the value of safety constant SC gets smaller (and may even be zeroed in the case of competition racing).

Each operation is assigned its own safety constant SC, which may differ from the other safety constants SC. More specifically, the safety constant SC of an operation increases as the precision with which the delay time DT of the preceding operation is estimated decreases.

In known power-assist transmissions, before an operation can be commanded, completion of the preceding operation is first checked. This is done by special sensors which determine the state (position and/or rotation speed) of the component parts of power-assist transmission 5. This method, however, may inevitably introduce delays caused by the time taken to check completion of the various operations. In a method according to an embodiment, on the other hand, no check is made that an operation is completed before commanding the next operation, but predicted delay times DT ensure an operation is actually completed just after (i.e. after a time lapse equal to safety constant SC) actual completion of the preceding operation. The sensors for determining the state (position and/or rotation speed) of the component parts of power-assist transmission 5, as opposed to being used to permit command of the various operations, are used to determine the actual value of each predicted delay time DT and so check, a posteriori (as stated), the correctness of the memorized predicted delay times DT.

In an embodiment, power clutch 6 has a thrust chamber 21 filled with pressurized oil 22; and a number of disks 23. When thrust chamber 21 is filled with pressurized oil 22, disks 23 are subjected to axial thrust substantially proportional to the pressure P of oil 22 inside thrust chamber 21.

Power clutch 6 is connected to a regulating device 24 for adjusting the position of power clutch 6 (i.e. the transmitted-torque value) by adjusting the pressure P of oil 22 inside thrust chamber 21. In actual use, central control unit 13 of transmission 5 controls regulation device 24 to adjust the position of power clutch 6 as described above.

Regulating device 24 comprises a tank 25 of oil 22 at atmospheric pressure, from which extends a conduit 26 fitted with a pump 27 and a non-return valve 28 for feeding pressurized oil 22 to a hydraulic accumulator 29. Hydraulic accumulator 29 is connected by a conduit 30 to an inlet of a proportional solenoid valve 31, from which extend a conduit 32 terminating in thrust chamber 21, and a conduit 33 terminating in tank 25. In actual use, solenoid valve 31 isolates thrust chamber 21 from tank 25 to maintain a constant pressure P of oil 22 in thrust chamber 21, connects thrust chamber 21 to tank 25 to reduce pressure P of oil 22 in thrust chamber 21, and connects thrust chamber 21 to hydraulic accumulator 29 to increase pressure P of oil 22 in thrust chamber 21.

Solenoid valve 31 is driven by a power supply 34 controlled by central control unit 13 of transmission 5, and which applies a variable voltage to the terminals of a control coil 35 of solenoid valve 31 to circulate electric current I through control coil 35. For solenoid valve 31 to be activated correctly, regulating device 24 comprises a sensor 36 for determining the pressure P of oil 22 inside thrust chamber 21, and a sensor 37 for determining the current I circulating through control coil 35 of solenoid valve 31.

Figure 5:
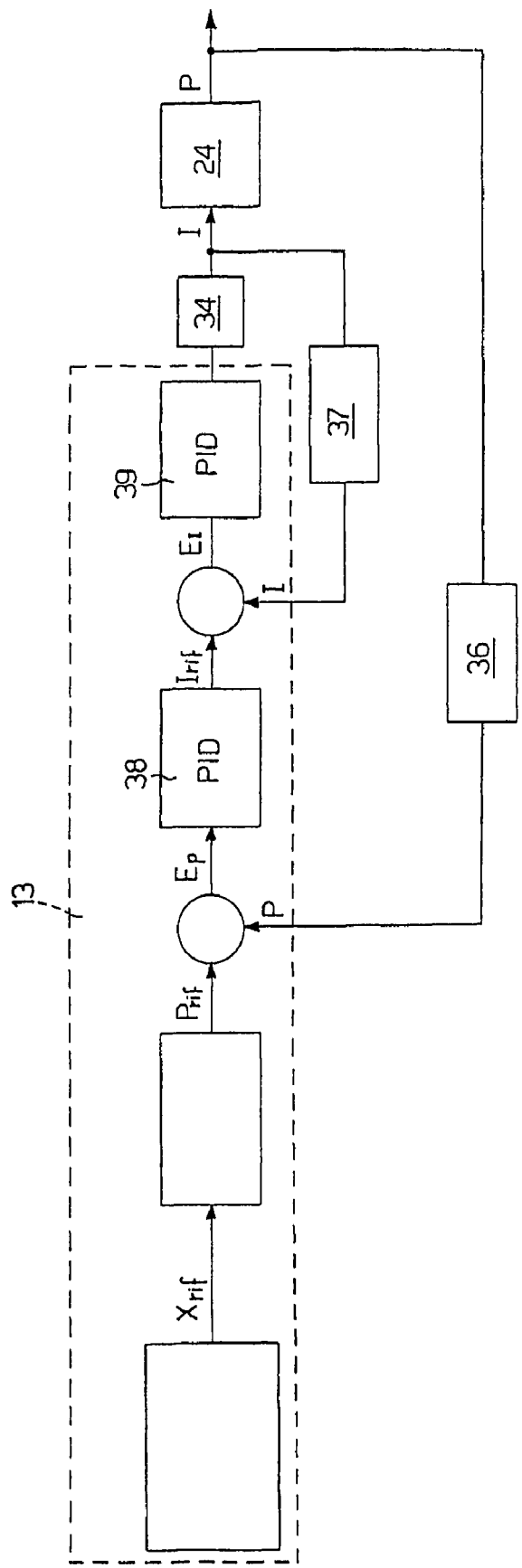
FIG. 5 shows a control scheme implemented by a central control unit of the FIG. 2 power-assist transmission.

In actual use, central control unit 13 of transmission 5 controls regulating device 24 by driving power supply 34 to adjust pressure P of oil 22 in thrust chamber 21 as described above, and so adjust the axial thrust exerted on disks 23 of clutch 6 and hence the position X of power clutch 6. As shown in FIG. 5, the desired position value $X_{rif}$ of power clutch 6 (or the equivalent desired value of the torque to be transmitted by power clutch 6) is established in central control unit 13 of transmission 5, and is translated into an equivalent desired value $P_{rif}$ of pressure P of oil 22 in thrust chamber 21; the desired value $P_{rif}$ is compared with the actual value P measured by sensor 36, to generate a pressure error $E_P$, from which a PID regulator 38 determines a desired value $I_{rif}$ of current I circulating through coil 35. The desired value $I_{rif}$ is compared with the actual value I measured by sensor 37, to generate a current error $E_I$, which is used by a PID regulator 39 to drive power supply 34. In other words, central control unit 13 of transmission 5 controls the value of pressure P of oil 22 in thrust chamber 21 by means of a first control loop employing the value of pressure P of oil 22 in thrust chamber 21 as a feedback variable, and a second control loop within the first control loop and employing the value of current I circulating through coil 35 of solenoid valve 31 as a feedback variable.

Figure 6:
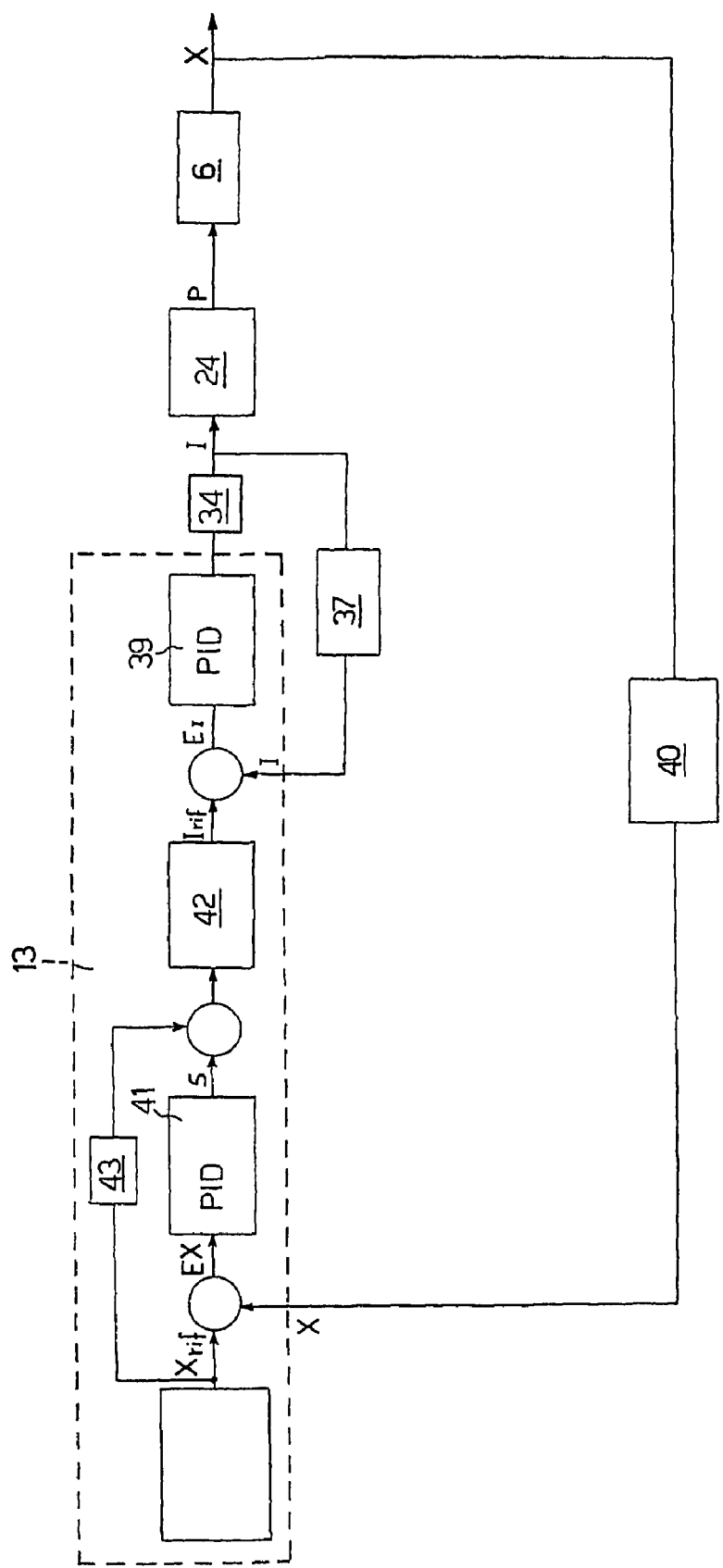
FIG. 6 shows a further control scheme implemented by a central control unit of the FIG. 2 power-assist transmission.

An alternative embodiment, shown in FIG. 6, comprises a position sensor 40 connected to central control unit 13 of transmission 5 to real-time determine the position X of power clutch 6. The fact that central control unit 13 of transmission 5 estimates a desired position value $X_{rif}$ of power clutch 6, and controls regulating device 24 by means of a feedback control loop employing the desired value of position X of power clutch 6 as a feedback variable, may be of advantage. The control loop controlling the desired value of position X of power clutch 6 may contain a control loop controlling the value of pressure P of oil 22 in thrust chamber 21 and/or a control loop controlling the value of current I circulating through coil 35.

More specifically, as shown in FIG. 6, the desired position value $X_{rif}$ of power clutch 6 is established in central control unit 13 of transmission 5, and is compared with the actual position value X of power clutch 6 measured by position sensor 40, to generate a position error $E_X$, from which a PID regulator 41 produces a control signal S, which is supplied to a control block 42 to determine a corresponding desired value $I_{rif}$ of current I circulating through coil 35. The desired value $I_{rif}$ is compared with the actual value I measured by sensor 37, to generate a current error $E_I$, which is used by PID regulator 39 to drive power supply 34. In an embodiment, to the control signal S supplied by PID regulator 41 is added a further contribution, which depends directly on the desired position value of power clutch 6 and is supplied by a computing block 43 implementing an inverse model. In other words, the signal supplied to control block 42 depends both on the position error $E_X$ in the position value of power clutch 6 (closed-loop feedback control), and on the desired position value $X_{rif}$ of power clutch 6 (direct open-loop control). This solution is employed to increase overall control response speed.

In other words, central control unit 13 of transmission 5 controls the position of power clutch 6 by means of a first control loop employing the value of position X of power clutch 6 as a feedback variable, and a second control loop within the first control loop and employing the value of current I circulating through coil 35 of solenoid valve 31 as a feedback variable.

In a different embodiment not shown, power-assist gearbox 9 is a dual-clutch type, and power clutch 6 is a dual clutch; in which case, operation as described above remains substantially unchanged, a major difference being that some operations may be performed simultaneously with others.

In a further embodiment not shown, dedicated electric synchronization cable 15 is eliminated, and central control unit 13 of transmission 5 communicates only with central control unit 12 of engine 4 over BUS line 14.

Hydraulically controlling power clutch 6 as described above may be extremely advantageous, by permitting highly consistent performance and, hence, extremely precise estimation of the predicted delay times DT relative to release and engagement of power clutch 6.

Power-assist transmission 5 as described above may have numerous advantages: it is cheap and easy to produce, by simply involving, as compared with currently marketed power-assist transmissions 5, the addition of dedicated electric synchronization cable 15, and provides for extremely fast gear shifting. Tests have shown that, in racing mode, power-assist transmission 5 as described above provides for shifting gear in 100 to 120 ms.

Moreover, in normal driving mode, power-assist transmission 5 as described above provides for shifting gear with a high level of driver comfort, and in particular rapidly and with no sharp longitudinal acceleration/deceleration of vehicle 1.

From the foregoing it will be appreciated that, although specific embodiments have been described herein for purposes of illustration, various modifications may be made without deviating from the spirit and scope of the present disclosure.

The invention claimed is:

1. A method of shifting gear in a power-assist transmission; to shift gear, the method comprises performing, in sequence, a series of operations, each of which must be completed prior to completion of the next operation; and the method further comprising the steps of:
   estimating for each operation a predicted delay time corresponding to the time lapse between the instant the operation is commanded, and the instant the operation is actually completed;
   commanding a first operation at a first instant;
   estimating a second instant, at which the first operation will actually be completed, by adding the predicted delay time of the first operation to the first instant at which the first operation was commanded;
   determining a third instant, at which to command a second successive operation, by subtracting from the second instant the predicted delay time of the second successive operation reduced by a safety constant for preventing completion of the first operation and completion of the second successive operation from overlapping; and
   commanding the second successive operation at the third instant.

2. A method as claimed in claim 1, wherein the power-assist transmission comprises a power-assist gearbox operated by a first servocontrol for engaging/disengaging a gear, and by a second servocontrol for selecting a gear; and a power clutch operated by a third servocontrol; and the series of operations to be performed to shift gear comprises:

releasing the power clutch by operating the third servocontrol;

disengaging the currently engaged gear by operating the first servocontrol;

selecting the desired gear by operating the second servocontrol;

engaging the desired gear by operating the first servocontrol; and engaging the power clutch by operating the third servocontrol.

3. A method as claimed in claim 1, wherein the power-assist transmission comprises a power-assist gearbox operated by a first servocontrol for engaging/disengaging a gear, and by a second servocontrol for selecting a gear; and a power clutch operated by a third servocontrol; and the series of operations to be performed to shift gear comprises:

reducing the drive torque generated by an engine;

releasing the power clutch by operating the third servocontrol;

disengaging the currently engaged gear by operating the first servocontrol;

selecting the desired gear by operating the second servocontrol;

engaging the desired gear by operating the first servocontrol;

engaging the power clutch by operating the third servocontrol; and increasing the drive torque generated by the engine.

4. A method as claimed in claim 1, wherein each predicted delay time is initially memorized at a design and setup step, and is subsequently checked and, if necessary, corrected at each gear shift operation.

5. A method as claimed in claim 4, wherein, at each gear shift operation, the actual value of each predicted delay time is determined, and, if the memorized predicted delay time differs significantly from the measured delay time, the memorized predicted delay time is corrected using the measured delay time.

6. A method as claimed in claim 5, wherein, if the memorized predicted delay time differs significantly from the measured delay time, the new memorized predicted delay time is calculated as the average of the previous memorized predicted delay time and the measured delay time.

7. A method as claimed in claim 1, wherein each predicted delay time is expressed as a function of actual working temperature.

8. A method as claimed in claim 1, wherein the value of the safety constant is a function of a selected driving mode; as the selected driving mode tends increasingly towards racing mode, the value of the safety constant gets smaller.

9. A method as claimed in claim 1, wherein each operation is assigned its own safety constant which may differ from the other safety constants.

10. A method as claimed in claim 1, wherein the series of operations to be performed to shift gear also comprises reducing the drive torque generated by an engine at the start of the gear shift, and increasing the drive torque generated by the engine at the end of the gear shift; and a request to vary the drive torque when shifting gear is sent by a central control unit of the transmission to a central control unit of the engine over a dedicated electric synchronization cable connecting the central control unit of the transmission directly to the central control unit of the engine.

11. A method as claimed in claim 10, wherein, over the dedicated electric synchronization cable, the central control unit of the transmission normally sends a low logic state, and sends a high logic state when the drive torque generated by the engine is to be cut off when shifting gear.

12. A method as claimed in claim 10, wherein transmission of a drive torque variation command from the central control unit of the transmission to the central control unit of the engine comprises the following steps:

the central control unit of the transmission sends the drive torque variation command to the central control unit of the engine over the dedicated electric synchronization cable;

at the same time, the central control unit of the transmission sends the central control unit of the engine the same command in a confirm message over a BUS connection;

the central control unit of the engine executes the drive torque variation command received over the dedicated electric synchronization cable as soon as the command is received; and the central control unit of the engine suspends execution of the drive torque variation command, if it does not receive the confirm message over the BUS connection within a predetermined time interval.

13. A method as claimed in claim 12, wherein, in the event of inconsistency between commands received over the dedicated electric synchronization cable and commands received over the BUS connection, a fault condition of the dedicated electric synchronization cable is diagnosed, and only the commands sent over the BUS connection are executed.

14. A method as claimed in claim 10, wherein, to reduce the drive torque generated by the engine when shifting gear, the central control unit of the engine does not alter the position of a throttle of the engine, and simply controls the injectors to prevent fuel injection.

15. A method as claimed in claim 1, wherein the power-assist transmission comprises a power-assist gearbox operated by a first servocontrol for engaging/disengaging a gear, and by a second servocontrol for selecting a gear; and a power clutch comprising a number of disks integral with a drive shaft of the engine or with an input shaft of the gearbox, and a thrust chamber filled with a pressurized fluid for exerting variable axial thrust on the disks; the power clutch being operated by a third servocontrol, which varies the pressure of the fluid in the thrust chamber to drive the power clutch.

16. A method as claimed in claim 15, wherein the third servocontrol comprises a solenoid valve for selectively connecting the thrust chamber to a drain tank for draining the fluid, or to a supply tank for supplying the pressurized fluid; and driving the power clutch by means of the third servocontrol comprises the steps of:

establishing a desired position value of the power clutch;

estimating a desired pressure value of the fluid in the thrust chamber as a function of the desired position value of the power clutch; and controlling the solenoid valve to apply the desired pressure value of the fluid inside the thrust chamber.

17. A method as claimed in claim 16, wherein driving the power clutch by means of the third servocontrol comprises the further steps of:

determining the pressure value of the fluid in the thrust chamber by means of a first sensor of the third servocontrol;

determining the value of the current circulating through the solenoid valve by means of a second sensor of the third servocontrol;

controlling the pressure value of the fluid in the thrust chamber by means of a first control loop employing the pressure value of the fluid in the thrust chamber as a feedback variable;

controlling the value of the current circulating through the solenoid valve by means of a second control loop within the first control loop and employing the value of the current circulating through the solenoid valve as a feedback variable.

18. A method as claimed in claim 15, wherein driving the power clutch by means of the third servocontrol comprises the steps of:

establishing a desired position value of the power clutch; and controlling the third servocontrol by adding a feedback control loop employing the desired position value of the power clutch as a feedback variable, and a direct open control loop employing the desired position value of the power clutch as a control variable.

* * * * *

UNITED STATES PATENT AND TRADEMARK OFFICE
CERTIFICATE OF CORRECTION

PATENT NO. : 8,229,636 B2
APPLICATION NO. : 11/884635
DATED : July 24, 2012
INVENTOR(S) : Baldet et al.

It is certified that error appears in the above-identified patent and that said Letters Patent is hereby corrected as shown below:

On the Title page of the patent, item [75] city of residence of the third inventor Amedeo Visconti, please change "Turin" to -- Torino --.

Signed and Sealed this
Twentieth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,229,636 B2
APPLICATION NO. : 11/884635
DATED : July 24, 2012
INVENTOR(S) : Franck Baldet et al.

It is certified that error appears in the above-identified patent and that said Letters Patent is hereby corrected as shown below:

On the Title page item [30], please change the foreign application priority data from "BO05A0086" to "BO05A000086".

Signed and Sealed this
Twentieth Day of August, 2013

Teresa Stanek Rea
*Acting Director of the United States Patent and Trademark Office*